Aug. 14, 1962   F. SINOPOLI   3,049,688
PORTABLE ELECTRICAL RECEPTACLE BOX
Filed Aug. 31, 1959
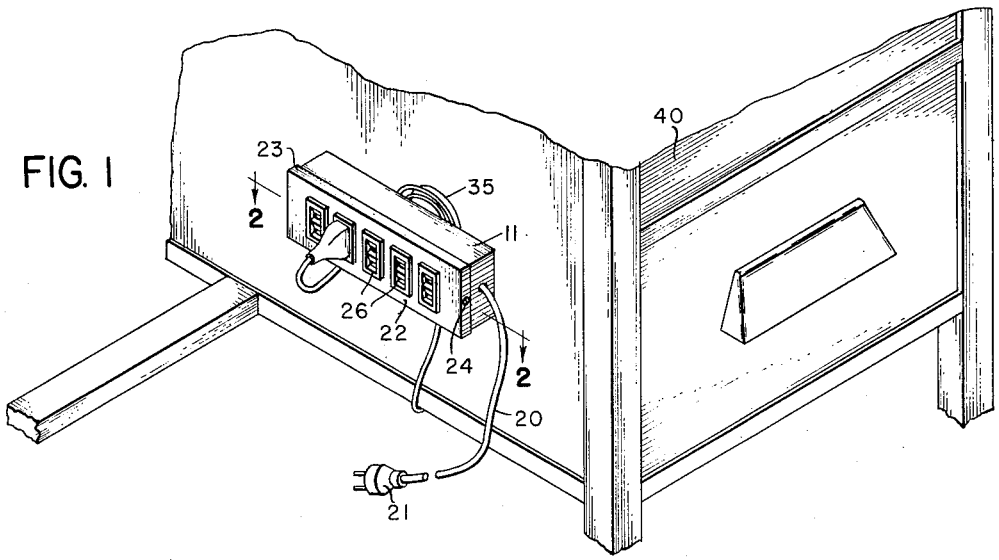
FIG. 1
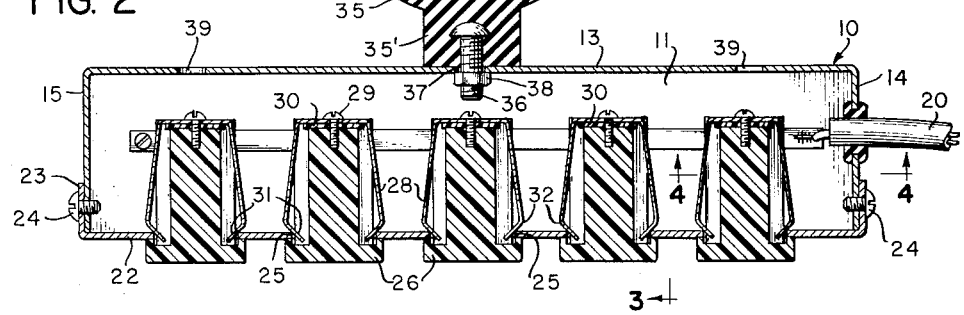
FIG. 2
FIG. 3
FIG. 4
INVENTOR
FRANK SINOPOLI
BY  A. Yates Dowell
ATTORNEY

United States Patent Office 3,049,688
Patented Aug. 14, 1962

3,049,688
PORTABLE ELECTRICAL RECEPTACLE BOX
Frank Sinopoli, 509 N. Eugene St., Greensboro, N.C.
Filed Aug. 31, 1959, Ser. No. 837,056
1 Claim. (Cl. 339—12)

This invention relates to electrical devices, the manner of energizing the same and the distribution and availability of electrical energy for supplying current thereto and for the operation thereof.

The invention relates particularly to electrical connections between devices to be supplied with electricity and the sources of such electricity including specifically a portable box having a series of receptacles for receiving electrical plugs of multiple appliances with means for fastening the box to a support in a manner that the cord can be wrapped around such support.

Heretofore the number of electrical devices for use in a given area has been limited by the number of electrical outlets available and efforts have been made to overcome this difficulty in various ways including the use of multiple outlets and the installation of additional outlets. These however have not been adequate as the distribution can never be sufficient to supply all the needs or requirements without violation of building codes and excessive costs. Also a large number of exposed electrical cords have been used. These have created hazards and marred appearance.

It is an object of the invention to solve the problems mentioned and to provide a portable box or receptacle containing multiple outlets and a single connection to a source of electrical energy as well as a mounting structure therefor by which the device can be attached to a support and about which the cords of the electrical devices to be connected can be wound or otherwise disposed.

Another object of the invention is to provide a portable box or container having a removable cover or lid with openings in which a plurality of electrical receptacles are detachably held with an attaching or mounting portion by which the portable box or container can be supported on a smooth surface in any desired location and forming a projection about which the cords of the appliances can be disposed.

A further object of the invention is to provide a portable box or receptacle which is elongated with a removable cover having openings in which electrical receptacles are removably received, such receptacles being connected to a source of energy and with a quick attachable and detachable mounting element of reduced size for supporting the device in spaced relation to a wall and extending in opposite directions therefrom whereby the conductor can be disposed about the support and behind the box.

Other objects and advantages of the invention will be apparent from the following description taken in conjunction with the accompanying drawings wherein:

FIG. 1 is a perspective illustrating one application of the invention;

FIG. 2, an enlarged transverse section on the line 2—2 of FIG. 1;

FIG. 3, a vertical section on the line 3—3 of FIG. 2; and

FIG. 4, a section on the line 4—4 of FIG. 2.

Briefly stated the present invention comprises a portable electrical receptacle box in the form of an elongated rectangular container which is open at one side. A pair of buss bars are mounted on opposite sides of the container and are adapted to receive current from a conductor connected to a source of energy and entering the container through one end. A cover is provided for the open side of the box and such cover has a plurality of openings in which is received a series of spring retained receptacles which may be electrically connected to the buss bars. The container has a mounting member in the form of a suction cup for detachably mounting the container to a flat surface such as a wall so that a space is provided between the container and the wall wherein excess wire from the appliances to be plugged in may be wrapped around the suction cup so that there are no loose wires.

With continued reference to the drawing, the receptacle box of the present invention comprises an elongated container 10 having sides 11, 12 and 13 and ends 14 and 15. A pair of metallic strips or buss bars 16 and 17 are provided which are mounted on the sides 11 and 12 respectively by spacers or mounting blocks 18 and such buss bars are supplied with electrical current by a pair of wires 19 carried by a conductor 20 which enters the container through the end 14. The opposite end of the conductor 20 terminates in a plug 21 which may be plugged into an electrical outlet (not shown).

A cover 22 having flanges 23 which overlap the sides 11 and 12 and the ends 14 and 15 is provided and such cover is attached to the container 10 by fasteners 24. The cover 22 has a plurality of openings 25 in which is received a series of electrical receptacles 26 and such receptacles have recessed portions 27 on each side thereof in which is disposed a generally U-shaped clip 28. The clips 28 are mounted on the rear of the receptacles by screws 29 or other fastening means and are spaced from the receptacles by an insulating plate 30 so that current supplied to the contacts 31 of the receptacles cannot be grounded by the cover 22. The clips 28 are made of strips of flexible material with the spring action normally biased outwardly from the receptacles. The free ends 31 are disposed inwardly to provide a shoulder 32 so that when the receptacle is inserted in the opening 25 the clips 28 are depressed until the shoulders 32 pass through the opening at which time the clips 28 will be urged outwardly. The ends 31 bear against the openings 25 and urge the receptacle 26 into intimate contact with the cover 23 and hold such receptacles in place until sufficient force is applied to overcome the spring action of the clips 28. Each of the receptacles 26 is connected to the buss bars 16 and 17 by wires 33 and 34 to provide electrical current to the receptacles.

In order to mount the container on a flat surface such as a wall, a suction cup 35 is provided having a stem 35' in which a screw 36 or other fastening means is molded and such screw is adapted to pass through an opening 37 in the side wall 13 and be fastened in place by a nut 38.

If desired, the side 13 may have a pair of openings 39 to accommodate screws or other fasteners and the suction cup 35 may be removed in the event that a permanent connection is desired.

In the operation of the device, the suction cup 35 is pressed against a flat surface such as a desk 40 preferably on the inside thereof in a position where it is not seen by a casual observer and the plug 21 is plugged into an electrical outlet. Appliances on the desk or other structure may then be plugged into the receptacles 26 and any excess wire from the appliances may be wrapped around the stem 35' of the suction cup in the area between the container and the supporting surface of the desk. When it is desired to move the receptacle box, it is necessary only to break the seal of the suction cup and move the box to a new location.

It will be apparent that a novel receptacle box is provided to accommodate a plurality of electrical appliances in order to reduce the number of electrical outlets necessary and means is provided to accommodate excessive wire to reduce the ever present danger of tripping over loose wires.

It will be obvious to those skilled in the art that various changes may be made in the invention without departing from the spirit and scope thereof and therefore the invention is not limited by that which is illustrated in the drawings and described in the specification, but only as indicated in the accompanying claim.

What is claimed is:

The portable electrical receptacle box comprising a generally rectangular container open along one side, a pair of elongated conductive members in said container, one attached to each side of the container, an electrical conductor extending into said container and attached to said conductive members by means of which electrical energy may be transmitted thereto, an elongated cover on the open side of the container, means detachably securing said cover to said container, said cover having a plurality of spaced openings therein for the reception of electrical outlets, a plurality of electrical outlets fitting said openings and having oppositely disposed flexible members spaced apart a distance greater than the dimension of said openings whereby the outlets will be held fixed when inserted in said openings, a pair of wires connected to each outlet and said conductive members respectively for supply electrical energy to said outlets, and quick attachable and detachable means carried by said container by which the latter may be quickly mounted on a support and removed from said support for quick mounting in another location, said last named means having a stem upon which excess of said electrical conductor can be wrapped.

References Cited in the file of this patent

UNITED STATES PATENTS

| | | |
|---|---|---|
| 1,168,619 | Fornander | Jan. 18, 1916 |
| 1,333,003 | Titus | Mar. 9, 1920 |
| 1,681,678 | O'Donnell | Aug. 21, 1928 |
| 1,889,695 | Petersen | Nov. 29, 1932 |
| 2,055,397 | Zaiger | Sept. 22, 1936 |
| 2,219,568 | Stewart | Oct. 29, 1940 |
| 2,277,216 | Epstein | Mar. 24, 1942 |
| 2,277,532 | Smith | Mar. 24, 1942 |
| 2,414,575 | Windsor | Jan. 21, 1947 |
| 2,675,545 | Wolper | Apr. 13, 1954 |
| 2,915,736 | Smith et al. | Dec. 1, 1959 |
| 2,938,110 | Busch et al. | May 24, 1960 |